United States Patent
Wu

(10) Patent No.: US 7,841,051 B2
(45) Date of Patent: Nov. 30, 2010

(54) DUAL SWING HINGE STRUCTURE

(75) Inventor: Chen Hao Wu, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 134 days.

(21) Appl. No.: 12/078,511

(22) Filed: Apr. 1, 2008

(65) Prior Publication Data

US 2008/0276423 A1 Nov. 13, 2008

(30) Foreign Application Priority Data

May 8, 2007 (TW) .............................. 96207320 U

(51) Int. Cl.
*E05C 17/64* (2006.01)

(52) U.S. Cl. .............................. 16/337; 16/319; 16/333; 16/342; 16/343; 16/356

(58) Field of Classification Search ................... 16/319, 16/329, 333, 334, 337, 342, 343, 344, 350, 16/356, 233, 271, 291, 293, 277, 365, 387; 455/575.3, 575.8; 361/679.02, 679.21; 248/923, 248/919

See application file for complete search history.

(56) References Cited

U.S. PATENT DOCUMENTS

| 154,949 | A | * | 9/1874 | Hall ............................. 16/365 |
| 183,008 | A | * | 10/1876 | Jenkins ........................ 190/31 |
| 951,327 | A | * | 3/1910 | Meyer .......................... 16/365 |
| 1,867,346 | A | * | 7/1932 | Bittorf .......................... 16/262 |
| 3,146,487 | A | * | 9/1964 | Nelson et al. .................. 16/337 |
| 6,453,509 | B1 | * | 9/2002 | Shin ............................. 16/340 |
| 6,832,412 | B2 | * | 12/2004 | Kim ............................. 16/354 |
| 2005/0107142 | A1 | * | 5/2005 | Soejima ................... 455/575.3 |
| 2006/0185126 | A1 | * | 8/2006 | Su ............................... 16/340 |
| 2009/0134286 | A1 | * | 5/2009 | Lee et al. ................. 248/125.1 |

* cited by examiner

*Primary Examiner*—Robert J Sandy
*Assistant Examiner*—Emily M Morgan
(74) *Attorney, Agent, or Firm*—Guice Patents PLLC

(57) ABSTRACT

A dual swing hinge structure includes two fixed base frames each having a receiving groove and a pivot hole extending across the receiving groove, a first bracket, which has two coupling arms respectively inserted into the receiving grooves of the base frame and pivotally coupled to the pivot holes of the base frames with pivot pins and a mounting plate fastened to a first movable member, a second bracket, which has two coupling arms respectively pivotally coupled to the pivot pins that pivotally secure the first bracket to the base frames and a mounting plate fastened to a second movable member, and two first retaining members and two second retaining members respectively affixed to the coupling arms of the first bracket and the coupling arms of the second bracket and respectively coupled to the pivot pins for imparting a different torque force to the pivot pins such that the first bracket is immovable when the second bracket is biased relative to the base frames, and the second bracket is moved with the first bracket relative to the base frames when the first bracket is biased relative to the base frames.

6 Claims, 6 Drawing Sheets

DUAL SWING HINGE STRUCTURE

BACKGROUND OF THE INVENTION

1. Field of the Invention

The present invention relates to hinges and more particularly, to a dual swing hinge structure.

2. Description of the Related Art

Hinge is a bearing device adapted to connect two objects together, allowing a limited angle of rotation between them. Its application is popularly seen in our daily life. For example, hinges are used in a door for allowing swinging of the door panel relative to the door frame. A consumer electronic product with a lifting cover such as mobile computer, electronic dictionary, mobile video player, cell phone, etc., commonly uses a hinge to coupled the cover to the base member so that the cover can be opened from or closed on the base member. Further, friction means or cam wheel means may be used in a hinge to produce a torque force or friction force when one connected object is moved relative to the other, holding the moved object in the adjusted angular position.

A car handrail may use a hinge to secure a cover member, allowing the cover member to be opened from a chamber in the car handrail or closed on the chamber. However, a regular car handrail provides only one single chamber for holding things. It is difficult to keep things in a good order in one single chamber. Further, one single chamber does not allow for classification of different things.

SUMMARY OF THE INVENTION

The present invention has been accomplished under the circumstances in view. It is the main object of the present invention to provide a dual swing hinge structure, which comprises two brackets respectively pivoted to two base frames in such a manner that the first bracket is immovable when the second bracket is biased relative to the base frames, and the second bracket is moved with the first bracket relative to the base frames when the first bracket is biased relative to the base frames. It is another object of the present invention to provide a dual swing hinge structure, which is practical for use in a car handrail to connect two cover members for closing two separated chambers that are formed in the car handrail for keeping things.

According to one aspect of the present invention, the dual swing hinge structure comprises two base frames arranged opposite to each other, the base frames each comprising a mounting portion, a receiving groove extending in direction perpendicular to the mounting portion, two flanges disposed at two opposite sides of the receiving groove, and a pivot hole respectively cut through each of the flanges; a first bracket, the first bracket comprising two coupling arms respectively inserted into the receiving grooves of the base frames, at least one mounting plate, and two connection arms respectively connected between the coupling arms and at least one mounting plate of the first bracket; a second bracket, the second bracket comprising two coupling arms respectively inserted into the receiving grooves of the base frames, at least one mounting plate spaced from the at least one mounting plate of the first bracket at a distance, and two connection arms respectively connected between the coupling arms and at least one mounting plate of the second bracket; two pivot pins respectively fastened to the pivot holes of the base frames and the coupling arms of the first bracket and the second bracket to pivotally secure the first bracket and the second bracket to the base frames; two first retaining members respectively affixed to the coupling arms of the first bracket at one side opposite to the second bracket and respectively coupled to the pivot pins for imparting a torque force to the pivot pins when the first bracket is turned relative to the base frames; and two second retaining members respectively affixed to the coupling arms of the second bracket at one side opposite to the first bracket and respectively coupled to the pivot pins for imparting a torque force to the pivot pins when the second bracket is turned relative to the base frames. The torque force applied by the first retaining members to the pivot pins is greater than the torque force applied by the second retaining members to the pivot pins so that the first bracket is immovable when the second bracket is biased relative to the base frames, and the second bracket is moved with the first bracket relative to the base frames when the first bracket is biased relative to the base frames.

According to another aspect of the present invention, the first retaining members and the second retaining members are flat plate members having different thicknesses, each comprising an extension strip respectively affixed to respective straight sections of the coupling arms of the first bracket and the second bracket and a retaining portion respectively clamped on the pivot pins.

According to another aspect of the present invention, the at least one mounting plate of the first bracket or second bracket can be respectively formed integral with and obliquely connected between the connection arms of the first bracket or second bracket. Alternatively, the number of the at least one mounting plate of the first bracket or second bracket can be 2, and the two mounting plates are respectively and obliquely connected to the connection arms of the first bracket or second bracket and kept apart from each other.

According to still another aspect of the present invention, the dual swing hinge structure further comprises two friction rings respectively mounted on the pivot pins and stopped between the coupling arms of the first bracket and the coupling arms of the second bracket.

According to still another aspect of the present invention, the base frames each comprise a back stop wall and a bottom stop wall respectively disposed at back and bottom sides of the respective receiving grooves for stopping against the coupling arms of the first bracket and the second bracket to limit the turning angle of the first bracket and the second bracket relative to the base frames.

DETAILED DESCRIPTION OF THE PREFERRED EMBODIMENT

Figure 1:
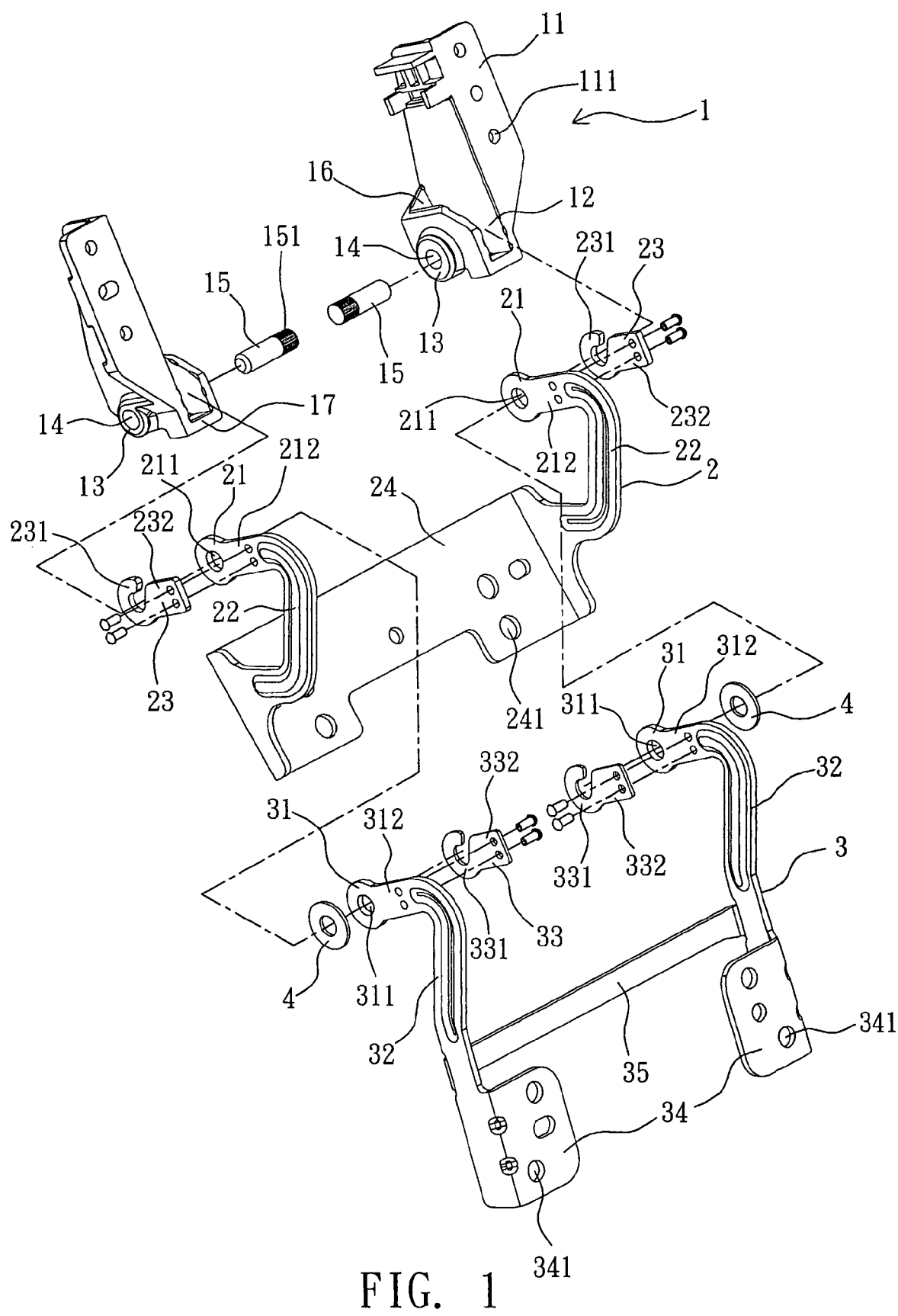
FIG. 1 is an exploded view of a dual swing hinge structure in accordance with the present invention.

Referring to FIG. 1, a dual swing hinge structure in accordance with the present invention is shown comprised of a pair of base frames 1, a first bracket 2, and a second bracket 3.

The base frames 1 are arranged relative to each other, each comprising a mounting portion 11 for connection to a support member, for example, a locating plate of a car handrail. As illustrated, the mounting portion 11 is a flat plate member having at least one mounting hole 111 for the mounting of a respective fastening member, for example, screw to affix the mounting portion 11 to a support member. The base frames 1 further comprises a receiving groove 12 disposed in a perpendicular manner relative to the mounting portion 11, two flanges 13 arranged at two sides of the receiving groove 12, and a pivot hole 14 cut through each flange 13 for the insertion of a pivot pin 15. According to this embodiment, the flanges 13 have an annular shape disposed around the pivot hole 14.

The first bracket 2 is made out of a plate member by means of stamping and bending, comprising two horizontal coupling arms 21, two retaining members 23 respectively fastened to the horizontal coupling arms 21 at an outer side, a mounting plate 24, two connection arms 22 respectively formed integral with and connected between the rear ends of the two horizontal coupling arms 21 and two opposite lateral sides of the mounting plate 24. The horizontal coupling arms 21 are respectively inserted with the respective front ends into the receiving grooves 12 of the base frames 1, each having a pivot hole 211 respectively pivotally coupled to the pivot holes 14 of the base frames 1 with a respective pivot pin 15 for allowing rotation of the first bracket 2 between the two base frames 1. The two retaining members 23 each have an extension strip 232 respectively riveted to the straight sections 212 of the horizontal coupling arms 21, and a retaining portion 231 disposed corresponding to the pivot hole 211 of the associating horizontal coupling arm 21 and respectively coupled to the pivot pins 15 to interfere with the associating pivot pins 15 and to cause friction for securing the first bracket 2 in position relative to the base frames 1. The retaining portion 231 can be a ring or hook defining a non-circular hole for receiving the associating pivot pin 15 and for causing friction with the associating pivot pin 15.

Further, the mounting plate 24 is obliquely connected to the rear ends of the connection arms 22, having a plurality of mounting through holes 241 for fastening to a first movable member with fastening devices, for example, screws. According to this embodiment, the mounting plate 24 is a single solid member. Alternatively, two separated mounting plates can be used and respectively affixed to the connection arms 22 to substitute for the aforesaid mounting plate 24.

Similar to the first bracket 2, the second bracket 3 is made out of a plate member by means of stamping and bending. However, the transverse width of the second bracket 3 is slightly smaller than the first bracket 2 so that the second bracket 3 can be received in and pivoted to the first bracket 2. The second bracket 3 comprises two horizontal coupling arms 31, two retaining members 33 respectively fastened to the horizontal coupling arms 31 at an inner side, two mounting plates 34, two connection arms 32 respectively formed integral with and connected between the rear ends of the two horizontal coupling arms 31 and the mounting plates 34, and a chinning bar 35 connected between the mounting plates 34. The horizontal coupling arms 31 are respectively inserted with the respective front ends into the receiving grooves 12 of the base frames 1, each having a pivot hole 311 respectively pivotally coupled to the pivot pins 15 that couple the pivot holes 211 of the first bracket 2 to the pivot holes 14 of the base frames 1, for allowing pivot motion of the second bracket 3 between the two base frames 1. The two retaining members 33 each have an extension strip 332 respectively riveted to the straight sections 312 of the horizontal coupling arms 31, and a retaining portion 331 disposed corresponding to the pivot hole 311 of the associating horizontal coupling arm 31 and respectively coupled to the pivot pins 15 to interfere with the associating pivot pins 15 and to cause friction for securing the second bracket 3 in position relative to the base frames 1. The mounting plates 34 each have a plurality of mounting through holes 341 for fastening to a second movable member with fastening devices, for example, screws.

Further, friction rings 4 are respectively mounted on the pivot pins 15 between the horizontal coupling arms 21 of the first bracket 2 and the horizontal coupling arms 31 of the second bracket 3 to provide a proper friction force during relative pivot motion between the first bracket 2 and the second bracket 3. According to the present preferred embodiment, the retaining members 23 of the first bracket 2 have a wall thickness relatively greater than the retaining members 33 of the second bracket 3, therefore the retaining members 33 of the first bracket 2 and the retaining members 33 of the second bracket 3 provide different torque force to facilitate relative pivot motion between the first bracket 2 and the second bracket 3. Therefore, when biasing the first bracket 2, the second bracket 3 can be kept immovable, or moved with the first bracket 2 as desired.

During installation, the second bracket 3 is attached to the inside of the first bracket 2 to keep the retaining members 23 of the first bracket 2 at an outer side and the retaining members 33 of the second bracket 3 at an inner side, and then the friction rings 4 are respectively set between the horizontal coupling arms 21 and 31 of the brackets 2 and 3 and inserted with the horizontal coupling arms 21 and 31 into the receiving grooves 12 of the base frames 1 respectively, and then the pivot pins 15 are respectively inserted through the pivot holes 14 of the base frames 1 and the pivot holes 211 of the first bracket 2 and the friction rings 4 and the pivot holes 311 of the second bracket 3 to pivotally secure the first bracket 2 and the second bracket 3 to the base frames 1. After installation, the mounting plates 34 of the second bracket 3 are kept apart from the mounting plate 24 of the first bracket 2. Further, the pivot pins 15 each have an embossed portion 151 disposed at one end and kept in friction engagement with the flanges 13 of the base frames 1 after their insertion into the associating pivot holes 14.

Further, the base frames 1 each further comprise a back stop wall 16 and a bottom stop wall 17 respectively disposed at the back and bottom sides of the respective receiving grooves 12 for stopping against the straight sections 212 of the horizontal coupling arms 21 of the first bracket 2 and the straight sections 312 of the horizontal coupling arms 31 of the second bracket 3 to limit the turning angle of the first bracket 2 and the second bracket 3 relative to the base frames 1.

Figure 2:
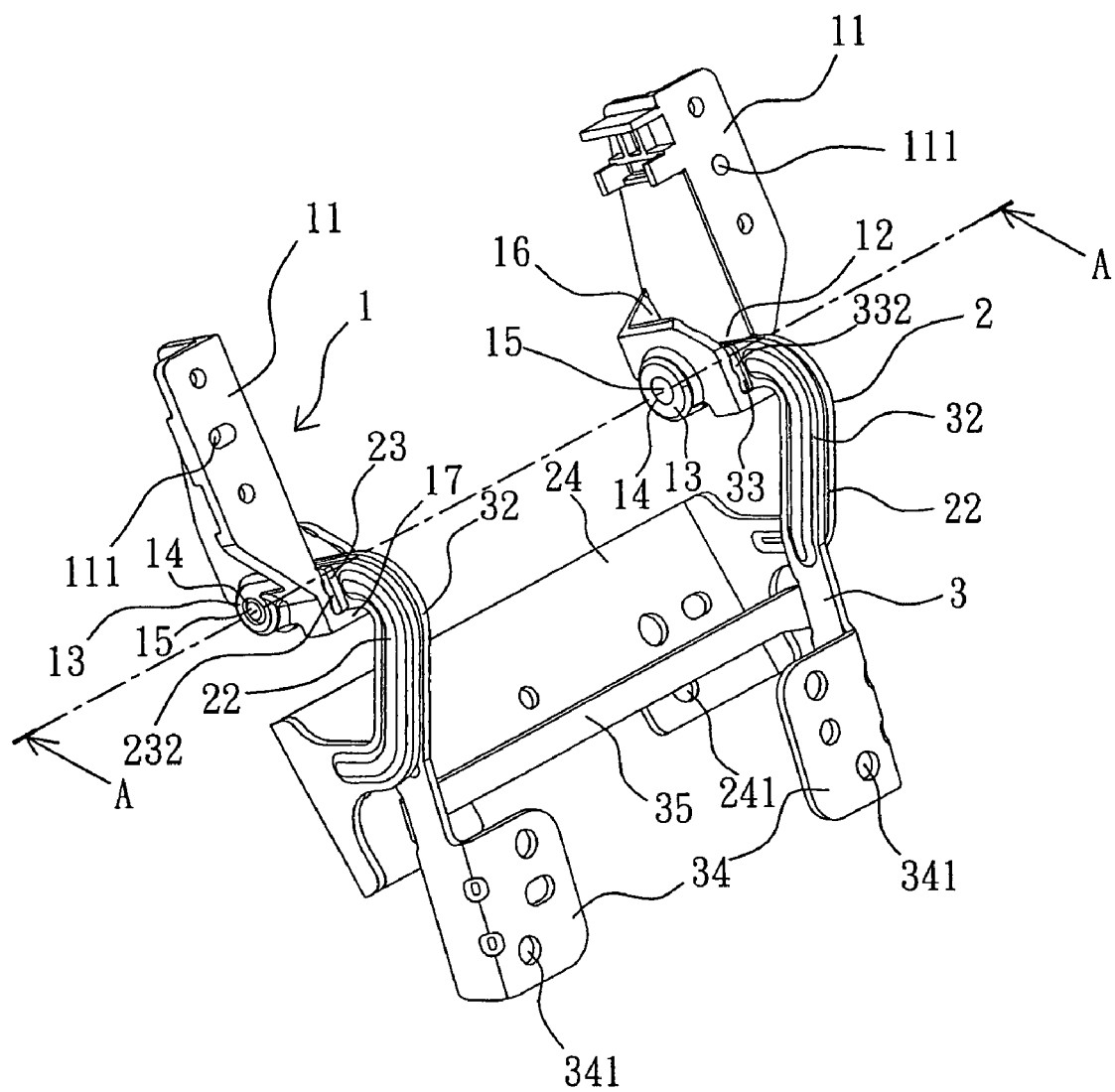
FIG. 2 is an elevational assembly view of the dual swing hinge structure in accordance with the present invention.
Figure 3:
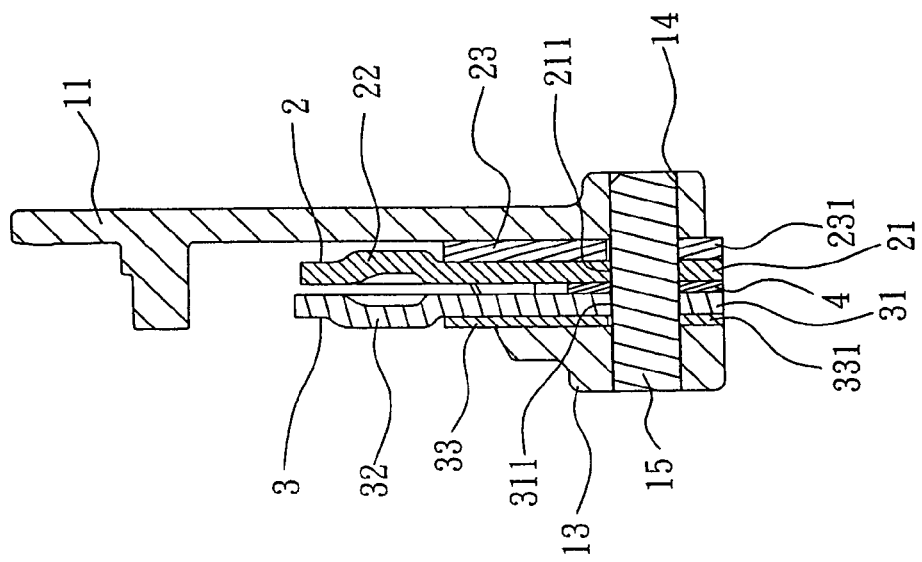
FIG. 3 is a sectional view taken along line A-A of FIG. 2.
Figure 3:
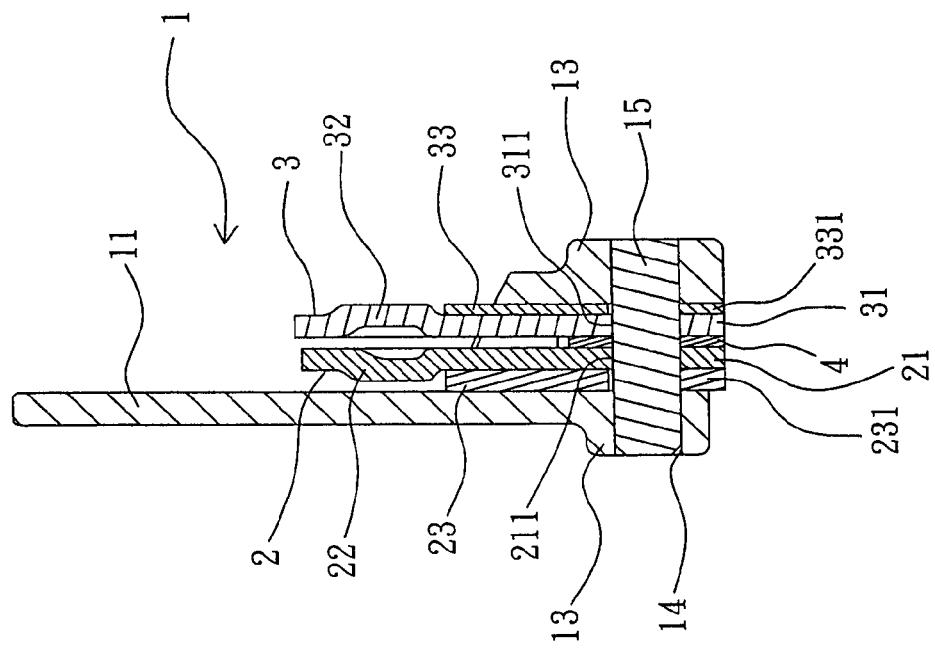
Figure 4:
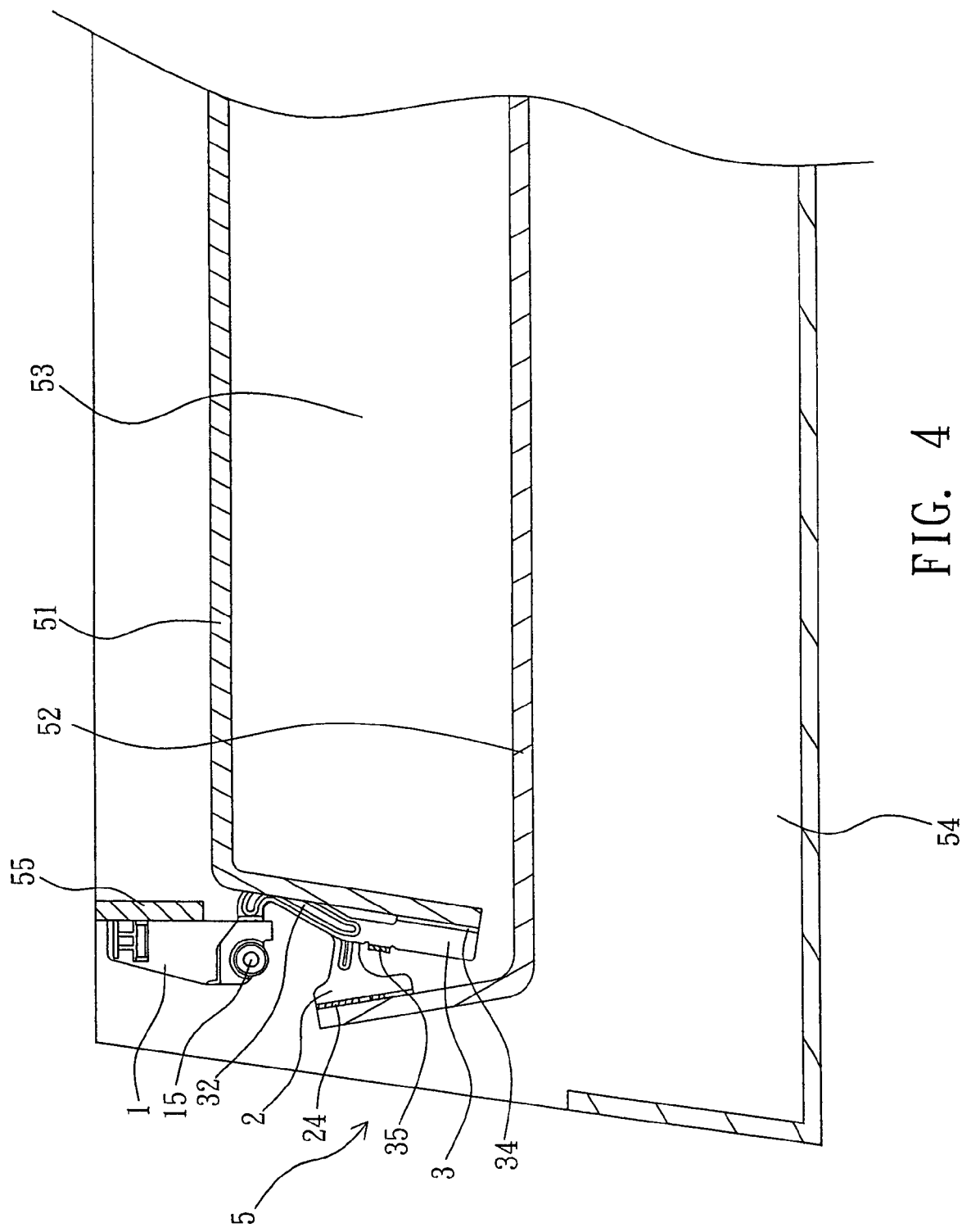
FIG. 4 is a schematic drawing showing the dual swing hinge structure used in a car handrail according to the present invention.

FIGS. 2 and 3 show the dual swing hinge structure assembled. FIG. 4 illustrates the dual swing hinge structure used in a car handrail 5. The car handrail 5 has a first cover member 51 and a second cover member 52. The first cover member 51 and the second cover member 52 are arranged at different elevations and respectively covering a first chamber 53 and a second chamber 54. The base frames 1 of the dual swing hinge structure of the present invention are respectively affixed to vertically extending a locating frame 55 of the car handrail 5, and the mounting plate 24 of the first bracket 2 and the mounting plates 34 of the second bracket 3 are respectively fastened to one side panel of the second cover member 52 and one side panel of the first cover member 51.

Figure 5:
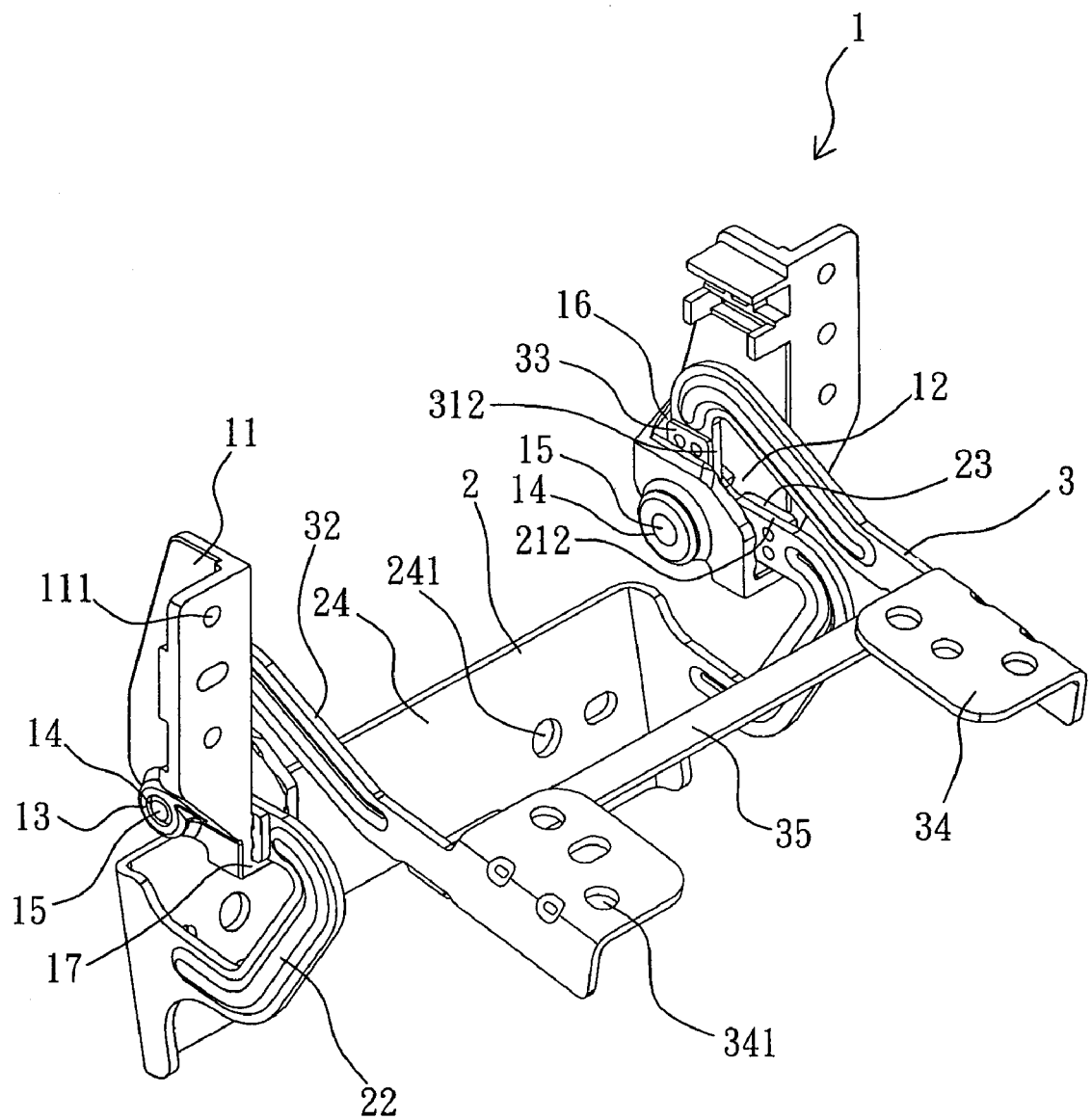
FIG. 5 is an elevational view of the present invention, showing the second bracket extended out.

When using the first chamber 53, lift the first cover member 51 to turn the second bracket 3 about the pivot pins 15. Because the torque force applied by the retaining members 33 of the second bracket 3 to the pivot pins 15 is smaller than the torque force applied by the retaining members 23 of the first bracket 2, the first bracket 2 is immovable when the second bracket 3 is moved with the first cover member 51. When the straight sections 312 of the horizontal coupling arms 31 of the second bracket 3 touch the back stop walls 16 of the base frames 1, as shown in FIG. 5, the second bracket 3 is stopped in place. At this time, as shown in FIG. 4, the second bracket 3 supports the first cover member 51 in an open position, and the user can access to the inside of the first chamber 53 to store or pick up things.

Figure 6:
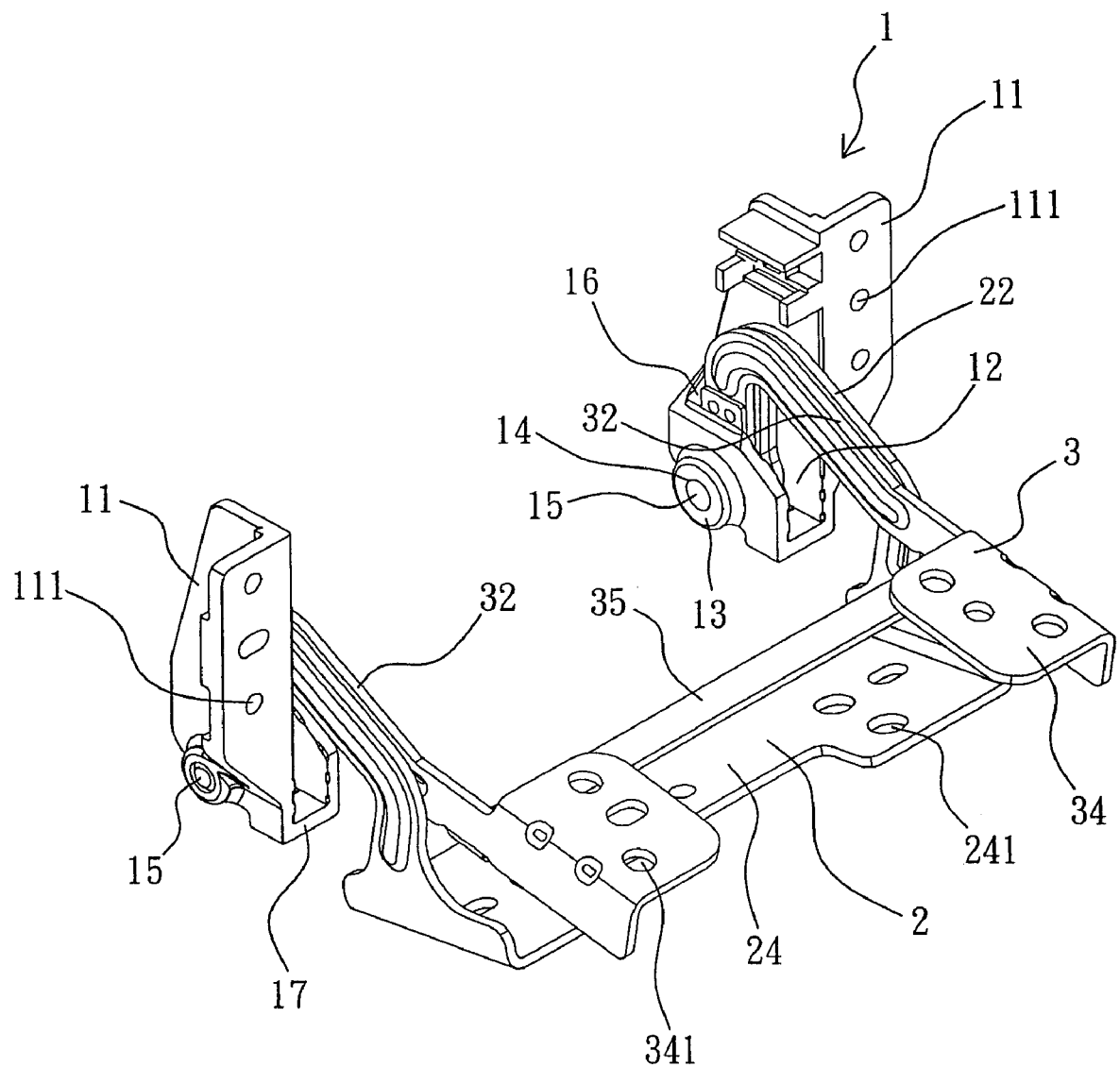
FIG. 6 is an elevational view of the present invention, showing the first bracket extended out.

When using the second chamber 54, lift the second cover member 52 to turn the first bracket 2 about the pivot pins 15 in counter-clockwise direction. Because the torque force applied by the retaining members 23 of the first bracket 2 to the pivot pins 15 is greater than the torque force applied by the retaining members 33 of the second bracket 3, the second bracket 3 is turned with the first bracket 2 when the user lifts the second cover member 52 to turn the first bracket 2 about the pivot pins 15. When the straight sections 312 of the horizontal coupling arms 31 of the second bracket 3 and the straight sections 212 of the horizontal coupling arms 21 of the first bracket 2 touch the back stop walls 16 of the base frames 1, as shown in FIG. 6, the first bracket 2 and the second bracket 3 are stopped in place. At this time, as shown in FIG. 4, the first bracket 2 and the second bracket 3 supports the second cover member 52 and the first cover member 51 in an open position, and the user can access to the inside of the second chamber 54 to store or pick up things.

By means of difference in torque between two brackets, biasing action of the bracket that provides a relatively smaller torque force does not cause movement of the bracket that provides a relatively greater torque force; when the bracket that provides a relatively greater torque force is biased, the other bracket that provides a relatively smaller torque force is synchronously moved.

Although a particular embodiment of the invention has been described in detail for purposes of illustration, various modifications and enhancements may be made without departing from the spirit and scope of the invention.

What is claimed is:

1. A dual swing hinge structure comprising:
   two base frames arranged opposite to each other, said base frames each comprising a mounting portion, a receiving groove extending in a direction perpendicular to said mounting portion, two flanges disposed at two opposite sides of said receiving groove, and a pivot hole respectively cut through each of said flanges;
   a first bracket, said first bracket comprising two coupling arms respectively inserted into the receiving grooves of said base frames, at least one mounting plate, and two connection arms respectively connecting the coupling arms and the at least one mounting plate of said first bracket;
   a second bracket, said second bracket comprising two coupling arms respectively inserted into the receiving grooves of said base frames, at least one mounting plate spaced from the at least one mounting plate of said first bracket at a distance, and two connection arms respectively connecting the coupling arms and at least one mounting plate of said second bracket;
   two pivot pins respectively fastened in the pivot holes of said base frames and the coupling arms of said first bracket and said second bracket to pivotally secure said first bracket and said second bracket to said base frames;
   two first retaining members respectively affixed to the coupling arms of said first bracket at one side opposite to said second bracket and respectively coupled to said pivot pins for imparting a first torque force to said pivot pins when said first bracket is turned relative to said base frames; and
   two second retaining members respectively affixed to the coupling arms of said second bracket at one side opposite to said first bracket and respectively coupled to said pivot pins for imparting a second torque force to said pivot pins when said second bracket is turned relative to said base frames;
   two friction rings respectively mounted on said pivot pins, each friction ring is located between the coupling arms of said first bracket and the coupling arms of said second bracket;
   wherein the first torque force applied by said first retaining members to said pivot pins is greater than the second torque force applied by said second retaining members to said pivot pin;
   wherein, when said second bracket is biased relative to said base frames, said second bracket pivots relative to said base frames and said first bracket is held in position by said first retaining members and said pivot pins; and
   wherein, when said first bracket is biased relative to said base frames, said first bracket pivots and said second bracket pivots with said first bracket relative to said base frames;
   wherein said base frames each comprise a back stop wall and a bottom stop wall respectively disposed at back and bottom sides of the respective receiving grooves for stopping against the coupling arms of said first bracket and said second bracket to limit the turning angle of said first bracket and said second bracket relative to said base frames.

2. The dual swing hinge structure as claimed in claim 1, wherein said first retaining members and said second retaining members are flat plate members having different thicknesses, said first retaining members and said second retaining members each comprising an extension strip respectively affixed to the coupling arms of said first bracket and said second bracket and a retaining portion respectively clamped on said pivot pins.

3. The dual swing hinge structure as claimed in claim 1, wherein the coupling arms of said first bracket and said second bracket each have a straight section; said first retaining members and said second retaining members each have an extension strip respectively riveted to the straight sections of the coupling arms of said first bracket and said second bracket.

4. The dual swing hinge structure as claimed in claim 1, wherein the at least one mounting plate of said first bracket is formed integral with and obliquely connected between the connection arms of said first bracket; the at least one mounting plate of said second bracket is formed integral with and connected to the connection arms of said second bracket.

5. The dual swing hinge structure as claimed in claim 1, wherein the number of the at least one mounting plate of said second bracket is two mounting plates, and the two mounting plates of said second bracket are respectively connected to the connection arms of said second bracket.

6. The dual swing hinge structure as claimed in claim 5, wherein said second bracket further comprises a chinning bar connected between the two mounting plates thereof.

* * * * *